United States Patent [19]

Yasunaga et al.

[11] Patent Number: 4,713,262

[45] Date of Patent: Dec. 15, 1987

[54] MANUFACTURING METHOD FOR A MAGNETIC RECORDING MEDIUM

[75] Inventors: Tadashi Yasunaga; Ryuji Shirahata, both of Kanagawa, Japan

[73] Assignee: Fuji Photo Film Co., Ltd., Kanagawa, Japan

[21] Appl. No.: 914,513

[22] Filed: Oct. 2, 1986

Related U.S. Application Data

[63] Continuation of Ser. No. 765,482, Aug. 14, 1985, abandoned.

[30] Foreign Application Priority Data

Aug. 14, 1984 [JP] Japan .................................. 59-169857
Aug. 14, 1984 [JP] Japan .................................. 59-169859
Aug. 14, 1984 [JP] Japan .................................. 59-169860

[51] Int. Cl.$^4$ ............................................. H01F 10/02
[52] U.S. Cl. .................................... 427/130; 427/128; 427/131; 427/132; 427/251; 427/295; 427/296; 427/299; 427/316; 427/319
[58] Field of Search ............... 427/128, 130, 131, 132, 427/251, 295, 296, 299, 316, 319

[56] References Cited

U.S. PATENT DOCUMENTS 4,450,186  5/1984  Shinohara ......................... 427/132

*Primary Examiner*—Bernard D. Pianalto
*Attorney, Agent, or Firm*—Sughrue, Mion, Zinn, Macpeak, and Seas

[57] ABSTRACT

A method for manufacturing a magnetic recording medium, comprising evaporating a magnetic metal material from an evaporation source to form a vapor stream of the magnetic metal material, vapor-depositing the magnetic metal material on a tape-shaped substrate moving along a cooling can such that the incident angle ($\theta$) of the vapor stream which is incident upon the substrate changes continuously from a high incident angle ($\theta$max) to a low incident angle ($\theta$min), and at the same time introducing one or more gases selected from the group consisting of a rare gas, $CO_2$ gas, $N_2$ gas, and nitrogen oxide gas, or a mixed gas composed of oxygen gas and one or more gases selected from the group consisting of a rare gas, $CO_2$ gas, $N_2$ gas and nitrogen oxide gas from a gas inlet part disposed at a position in the vicinity of the substrate and near the vapor stream at a low incident angle ($\theta$min) upon the substrate, thereby providing a ferromagnetic metal film on the substrate.

19 Claims, 1 Drawing Figure

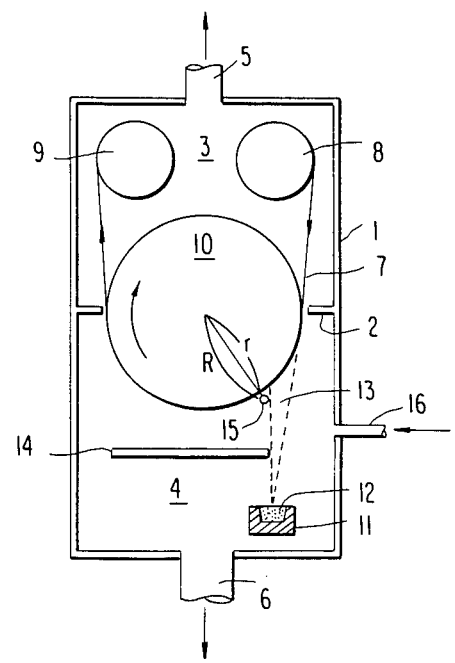

MANUFACTURING METHOD FOR A MAGNETIC RECORDING MEDIUM

This is a continuation of application Ser. No. 765,482 filed Aug. 14, 1985, now abandoned.

FIELD OF THE INVENTION

The present invention relates to a method for manufacturing a magnetic recording medium having a ferromagnetic metal film as a magnetic recording layer disposed on a tape-shaped substrate and more particularly, to a method for manufacturing a metal film-type magnetic recording medium having excellent magnetic characteristics and, at the same time, having excellent electromagnetic conversion characteristics in a short wavelength region.

BACKGROUND OF THE INVENTION

Hitherto, there have been widely used magnetic recording media of the coated type prepared by dispersing a powdered magnetic material such as the magnetic powder or ferromagnetic alloy powder of gamma-$Fe_2O_3$, gamma-$Fe_2O_3$ doped with Co, $Fe_3O_4$, $Fe_3O_4$ doped with Co, a berthollide compound of gamma-$Fe_2O_3$ and $Fe_3O_4$, $CrO_2$, or the like in an organic binder such as a vinyl chloride-vinyl acetate copolymer, a styrene-butadiene copolymer, an epoxy resin, a polyurethane, or the like and then coating the resulting dispersion on a non-magnetic substrate or support and drying it. In recent years, with an increasing demand for high density recording, keen attention has been given to so-called non-binder type magnetic recording media having as a binderless magnetic recording layer, a ferromagnetic metal film formed by a vapor deposition method such as vacuum deposition, sputtering, or ion plating or by a plating method such as electroplating or electroless plating, and various efforts have been made to put them into practice.

Since the conventional coated-type magnetic recording media comprise a magnetic material, mainly composed of a metal oxide, which has a smaller saturated magnetization than that of a ferromagnetic metal, reduction in the thickness of the magnetic layer, which is necessary for high density recording, leads to a lowering in the signal output, and therefore the limit of thickness reduction has been reached already. In addition, the conventional coated-type magnetic recording media have the defects that the processes for manufacturing them are complicated and require large incidental facilities for solvent recovery or prevention of environmental pollution. In binderless type magnetic recording media, the ferromagnetic metal film having saturated magnetization larger than that of the above-mentioned metal oxide is Aformed without a non-magnetic material such as a binder, so that the magnetic recording media have advantage that the magnetic layer thereof can be made ultra-thin for high density recording and also the process for manufacturing them can be simplified.

High coercive force and reduction in thickness are proposed theoretically and experimentally in order to meet the requirements for magnetic recording media for high density recording, and much is hoped for binderless type magnetic recording media, wherein the thickness of the magnetic recording layer is easily reduced to a thickness one order as small as that of a coated-type media and wherein the saturated magnetic flux density is high.

In particular, a method for manufacturing magnetic recording media by vacuum deposition is very advantageous because not only does it not require a treatment for waste liquids which is needed in the case of plating, but also it is a simple process and can be operated at a high deposition velocity. Examples of the conventional method for manufacturing a magnetic film having a coercive force and squareness property suited for magnetic recording media by vapor deposition include an oblique vapor deposition method as described in, e.g., U.S. Pat. Nos. 3,342,632 and 3,342,633.

In actually manufacturing a magnetic recording medium by providing a ferromagnetic metal film on a tape-shaped substrate by oblique vapor deposition, a tape-shaped substrate is conveyed along a cooling can and a vapor stream of a ferromagnetic metal material evaporated from an evaporation source is allowed to collide with the moving tape-shaped substrate obliquely, i.e., at a predetermined angle of incidence, to vapor deposit the magnetic metal material thereon. In this process, the larger the incident angle of the vapor stream upon the substrate, the larger the coercive force of the resulting magnetic film but, at the same time, the lower the vapor deposition efficiency, which is a problem in the production thereof. Introduction of oxygen gas in oblique vapor deposition was proposed for forming the magnetic film having a high coercive force at a relatively small incident angle. For example, a method in which a tape-shaped substrate is conveyed so that the incident angle ($\theta$) of the vapor stream upon the substrate may change continuously from a high incident angle ($\theta$max) to a low incident angle ($\theta$min) and, at the same time, an oxidative gas is introduced in the vicinity of the low incident angle ($\theta$min) of the vapor stream, is disclosed in U.S. Pat. No. 4,477,489. According to this method, a magnetic film having a high coercive force can be obtained, but the magnetic film is defective in that it deteriorates the squareness property.

A method for obliquely vapor depositing a ferromagnetic metal material on a substrate with the introduction of carbon dioxide gas into a vacuum chamber for improving the deteriorated squareness property, is disclosed in Japanese Patent Application (OPI) No. 208937/1983 (the term "OPI" used herein means a "published unexamined Japanese Patent Application").

Further, magnetic recording media obtained by a oblique vapor deposition method while introducing an oxidative gas or carbon dioxide gas have insufficient film strength as a magnetic film, so that they have insufficient durability when the magnetic tape travels in a VTR or the like, and curling of the tape often occurs with the magnetic film inside. Elimination of these defects is desired.

In addition, a method in which cobalt is obliquely vapor-deposited on a polyester film substrate while introducing nitrogen, argon, or hellium gas into the vacuum vessel where the vapor deposition is conducted in order to improve magnetic characteristics of the magnetic recording media is disclosed in "Shinku" (Vaccum), Vol. 24, No. 4, p. 243–245. However, no improvement in the magnetic characteristics of the magnetic film is achieved in the case where a magnetic tape is prepared by an oblique vapor deposition method under the conditions that a continuous tape-shaped substrate is continuously carried and the incident angle of vapor stream upon the substrate is changed continuously, with introduction of argon (Ar), hellium (He), nitrogen ($N_2$), or carbon dioxide ($CO_2$) gas from the vacuum vessel into the vacuum vessel.

Further, a method is disclosed in U.S. Pat. No. 4,450,186, in which a gas is injected out of the tip part of a mask for preventing a material to be vapor-deposited from depositing on the tip part of the mask to prepare a magnetic tape having uniform magnetic characteristics in the longitudinal direction. Although this prior art discloses that a change in magnetic characteristics caused by a change in the incident angle upon the continuous substrate due to deposition of vapor deposition material on the tip of the mask is prevented effectively by the injection of gas, it fails to describe improvement in the magnetic characteristics by the introduction of gas itself.

Further, a method for manufacturing a magnetic recording medium by a vapor deposition method while introducing a nitrogen oxide gas into a cobalt vapor stream is disclosed in Japanese Patent Application (OPI) No. 94135/1983. There has been a strong demand to improve the magnetic characteristics of the magnetic recording medium and improve the friction coefficient when a lubricant is applied to the magnetic recording medium.

SUMMARY OF THE INVENTION

An object of the present invention is to provide a method for manufacturing magnetic recording media free from the above-mentioned defects, in particular, to provide a method for manufacturing magnetic recording media having excellent magnetic characteristics.

Another object of the present invention is to provide a method for manufacturing magnetic recording media having excellent electromagnetic conversion characteristics in a short wavelength region.

Still another object of the present invention is to provide a method for manufacturing magnetic recording media having excellent film strength and, at the same time, hardly curling.

Yet another object of the present invention is to provide a method for manufacturing magnetic recording media having a low friction coefficient when a lubricant is applied thereto.

The present inventors have devoted themselves to studying the method for manufacturing magnetic recording media, and as a result, found that the above-mentioned objects are attained by carrying out vapor deposition with introducing a specified gas at a specified position relating to the substrate and to a vapor stream at a low incident angle upon the substrate.

The present invention is based on the above-mentioned discovery.

Therefore, the present invention provides a method for manufacturing magnetic recording media, comprising evaporating a magnetic metal material from an evaporation source to form a vapor stream of the magnetic metal material, vapor-depositing the magnetic metal material on a tape-shaped substrate moving along a cooling can such that the incident angle ($\theta$) of the vapor stream which is incident upon the substrate changes continuously from a high incident angle ($\theta$max) to a low incident angle ($\theta$min), and at the same time introducing one or more gases selected from the group consisting of a rare gas, $CO_2$ gas, $N_2$ gas, and nitrogen oxide gas, or a mixed gas composed of oxygen gas and one or more gases selected from the group consisting of a rare gas, $CO_2$ gas, $N_2$ gas and nitrogen oxide gas from a gas inlet part disposed at a position in the vicinity of the substrate and near the vapor stream at a low incident angle ($\theta$min) upon the substrate, thereby providing a ferromagnetic metal film on the substrate.

BRIEF DESCRIPTION OF THE DRAWING

FIGURE shows one example of a vacuum deposition apparatus for carrying out the method for manufacturing the magnetic recording medium according to the present invention.

DETAILED DESCRIPTION OF THE INVENTION

The method for manufacturing a magnetic recording medium of the present invention will be described in greater detail referring to FIGURE hereinafter.

According to one embodiment of the method shown for manufacturing magnetic recording media of the present invention, the inside of a vacuum vessel 1 is divided into an upper chamber 3 and a lower chamber 4 by a partition wall 2 and both chambers are separately exhausted to a vacuum through exhaust vents 5 and 6, respectively. In the upper chamber 3, a delivery roll 8 and wind-up roll 9 for a tape-shaped substrate 7 are disposed. The tape-shaped substrate 7 fed from the delivery roll 8 transfers into the lower chamber 4 along a cooling can 10. In the lower chamber 4, there is disposed an evaporation source 11, in which a magnetic metal material 12 is heated and evaporated. The vapor stream 13 of the magnetic metal material 12 arrives through a mask 14 on the surface of the tape-shaped substrate 7 moving along the cooling can 10 and is deposited on the said surface as a vapor-deposited film. The mask 14 is disposed so that only the vapor stream 13 at a desired incident angle upon the substrate 7 arrives at the substrate 7. As the tape-shaped substrate 7 is transferred by the rotation (clockwise in the FIGURE) of cooling can 10, the incident angle ($\theta$) of the vapor stream 13 of the magnetic metal material 12 upon the substrate 7 changes continuously from the high incident angle ($\theta$max) to the low incident angle ($\theta$min), and the vapor deposition is carried out under the above-mentioned condition. A gas inlet nozzle 15 is set at a position in the vicinity of the substrate 7 on the surface of the cooling can 10 and also near the vapor stream at the low incident angle ($\theta$min) upon the substrate 7. The gas inlet nozzle 15 is set at a position having a ratio (R/r) of the distance (R) between the center of the cooling can 10 and the nozzle 15 to the radius (r) of the cooling can 10 in a given range, and a gas is injected through the nozzle 15. The tape-shaped substrate 7 having a ferromagnetic film formed thereon travels from the lower chamber 4 to the upper chamber 3 along the cooling can 10 and then is wound up by the wind-up roll 9.

In the method of the present invention, the desirable range of the ratio (R/r) of the distance (R) between the center of the cooling can 10 and the gas inlet nozzle 15 to the radius (r) of the cooling can is 1.10 or less, preferably in the range of from 1.0 to 1.10.

Examples of the ferromagnetic metal materials used in the present invention include a metal such as Fe, Co, Ni, and the like and a ferromagnetic alloy such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Sb, Mn-Al, Fe-Cr, Co-Cr, Ni-Cr, Fe-Co-Cr, Ni-Co-Cr, Fe-Co-Ni-Cr, and the like. Particularly, Co or an alloy containing 70 wt% or more of Co is preferred. The ferromagnetic film may be a single layer film or a multilayer film. it must have a total thickness large enough to give a sufficient output as a magnetic recording medium and it must be thin enough to carry out sufficiently high density recording. Therefore, the thickness of ferromagnetic film is generally about from 0.02 micrometer to 5.0 micrometers, preferably from 0.05 micrometer to 2.0 micrometers.

Preferred examples of the substrate used in the present invention include a plastic base such as polyethylene terephthalate, polyimide, polyamide, polyvinyl chloride, cellulose triacetate, polycarbonate, and polyethylene naphthalate. In addition, a metal belt such as brass, stainless steel, or titanium can be used as a substrate.

It is generally preferred that the incident angle of the vapor stream of the magnetic metal material used in the present invention, be in the range of from 20° to 90° and it is, in particular, more preferred that the high incident angle ($\theta$max) is from 60° to 90° and the low incident angle ($\theta$min) is from 20° to 75°.

Examples of the rare gas used in the present invention include an element of Group O in the Periodic Table, such as, helium (He), neon (Ne), argon (Ar), krypton (K), xenon (Xe) and radon (Rn), and preferably Ar and Ne are used.

Examples of the nitrogen oxide gas used in the present invention include NO, $N_2O$, $N_2O_3$, $NO_2$, $N_2O_4$ and $N_2O_5$, and preferably $N_2O$ is used.

In the method of the present invention, a mixing ratio of oxygen gas to a rare gas, $CO_2$ gas, $N_2$ gas, or nitrogen oxide gas, that is, oxygen gas/(rare gas, $CO_2$ gas, $N_2$ gas or nitrogen oxide gas), is generally less than 2.0, preferably in the range of from 0.5 to 2.0.

Those magnetic recording media manufactured using $N_2$ gas, nitrogen oxide gas, or a mixed gas composed of oxygen gas and one of these gases can be transformed into one having a low friction coefficient and excellent running properties by forming a lubricating layer on the surface of the magnetic metal film layer thereof. Known lubricants as described in Japanese Patent Publication No. 26890/1981 can be used.

The present invention will be described specifically in examples hereinafter, but the invention is not construed as being limited to the examples.

EXAMPLE 1

A ferromagnetic film was formed on a polyethylene terephthalate film substrate having a thickness of 12.5 micrometers using the apparatus as shown in the FIGURE for preparing a magnetic tape. The cooling can had a radius of 350 mm, and the gas inlet nozzle was set at a position having a ratio R/r of 1.05. Under the conditions that the substrate film had a width of 100 mm, the conveying speed of the substrate film was 20 m/min, the high incident angle ($\theta$max) was 90°, and the low incident angle ($\theta$min) was 40°, a Co-Ni alloy (having a Ni content of 20 wt%) was evaporated, and a ferromagnetic layer having a thickness of 1,200 Å was formed on the substrate film. Several kinds of mixed gases composed of argon gas and oxygen gas having various mixing ratios thereof were introduced through the nozzle 15 to prepare several kinds of magnetic tapes. The thus obtained magnetic tapes were measured for magnetic characteristics and for electromagnetic conversion characteristics. As the magnetic characteristics, the coercive force and squareness ratio were measured with a vibrating type magnetometer. As the electromagnetic conversion characteristics, a video signal output at 6 MHz was measured with the beta type VTR having the relative speed between the tape and the magnetic head of the VTR of 3.5 m/sec.

Measurement results are shown in Table 1.

TABLE 1

| Sample No. | Vapor Deposition Conditions | | | Magnetic Characteristics | | Video Output (dB) |
|---|---|---|---|---|---|---|
| | Ar Amount Introduced (cc/min) | $O_2$ Amount Introduced (cc/min) | Pressure of Lower Chamber ($\times 10^{-4}$ Torr) | Coercive Force (Oe) | Squareness Ratio | |
| 1 | 0 | 0 | 0.8 | 570 | 0.92 | 0 |
| 2 | 60 | 0 | 2.9 | 720 | 0.92 | 3.5 |
| 3 | 150 | 0 | 5.8 | 815 | 0.92 | 4.0 |
| 4 | 300 | 0 | 10.0 | 880 | 0.92 | 5.0 |
| 5 | 0 | 365 | 1.3 | 730 | 0.81 | 1.5 |
| 6 | 90 | 365 | 2.9 | 890 | 0.82 | 2.0 |
| 7 | 190 | 365 | 5.8 | 925 | 0.86 | 5.0 |
| 8 | 250 | 365 | 10.0 | 960 | 0.86 | 5.5 |
| 9 | 0 | 590 | 2.2 | 850 | 0.74 | 2.0 |
| 10 | 110 | 590 | 5.0 | 910 | 0.75 | 5.5 |
| 11 | 260 | 590 | 10.0 | 980 | 0.81 | 6.0 |

From the results shown in Table 1, it can be seen that when the mixed gas composed of argon gas and oxygen gas having mixing ratio of oxygen gas to argon gas in the range of from 0 to 2.0 by volume is introduced through the nozzle 15, a magnetic recording medium having excellent magnetic characteristics and video output can obtained.

EXAMPLE 2

Magnetic tapes were prepared under the same conditions as in Example 1 except that argon gas was introduced through the nozzle 15 at the rate of 300 cc/min. In this process, the position of nozzle 15 was changed variously and magnetic tapes corresponding to the various values of the ratio R/r were prepared. The thus obtained magnetic tapes were measured for magnetic characteristics and for video outputs in the same manner as in Example 1. For comparison, a sample was prepared under the condition that the argon gas was introduced through a nozzle 16 shown in the FIGURE. Results are shown in Table 2.

TABLE 2

| Sample No. | R/r Value | Magnetic Characteristics | | Video Output (dB) |
|---|---|---|---|---|
| | | Coercive Force (Oe) | Squareness Ratio | |
| 12 | 1.01 | 915 | 0.92 | 5.5 |
| 13 | 1.10 | 845 | 0.92 | 4.5 |
| 14 | 1.15 | 620 | 0.92 | 1.0 |
| 15 | 1.20 | 590 | 0.92 | 0.5 |
| 16 | Intro. through nozzle 16 | 575 | 0.92 | 0 |

Comparison of sample Nos. 4, 12, 13, 14, 15, and 16 indicates clearly that excellent magnetic recording media can be prepared when the nozzle is set at a position having the value of the ratio R/r in the range of 1.10 or less.

value of the load when peeling of the film occurred. For the curling, the magnetic tape slit into a ½ inch width was measured for the curvature radius of curl in the width direction of tape and when the curvature radius was $r_o$, the curl value was determined as $10/r_o$. Measurement results are shown in Table 4.

TABLE 4

| Sample No. | Vapor Deposition Conditions | | | Magnetic Characteristics | | Film Strength (g) | Curl Value |
|---|---|---|---|---|---|---|---|
| | $CO_2$ Amount Introduced (cc/min) | $O_2$ Amount Introduced (cc/min) | Pressure of Lower Chamber ($\times 10^{-4}$ Torr) | Coercive Force (Oe) | Squareness Ratio | | |
| 23 | 0 | 0 | 0.8 | 570 | 0.92 | 33 | 15 |
| 24 | 60 | 0 | 2.9 | 750 | 0.92 | 43 | 7 |
| 25 | 150 | 0 | 6.0 | 820 | 0.92 | 47 | 5 |
| 26 | 280 | 0 | 10.0 | 880 | 0.92 | 52 | 3 |
| 27 | 0 | 365 | 1.4 | 730 | 0.81 | 35 | 15 |
| 28 | 80 | 365 | 3.1 | 750 | 0.82 | 39 | 13 |
| 29 | 190 | 365 | 5.9 | 870 | 0.85 | 49 | 9 |
| 30 | 290 | 365 | 10.0 | 920 | 0.85 | 52 | 5 |
| 31 | 0 | 590 | 2.2 | 850 | 0.74 | 37 | 18 |
| 32 | 160 | 590 | 5.2 | 880 | 0.75 | 39 | 12 |
| 33 | 300 | 590 | 10.0 | 950 | 0.80 | 50 | 3 |

EXAMPLE 3

A ferromagnetic metal film was formed on a polyethylene terephthalate film substrate having a thickness of 9.5 micrometers to prepare a magnetic tape using the apparatus shown in the FIGURE provided. The cooling can had a radius of 425 mm. under the conditions that the conveying speed of the substrate film having a width of 300 mm was 50 m/min, the high incident angle ($\theta$max) was 85°, the low incident angle ($\theta$min) was 45°, and helium gas, oxygen gas or a mixture of the gases was introduced, the vapor deposited film of a Co-Cr alloy (having a Cr content of 5 wt%) was formed in a film thickness of 1500 Å on the substrate film.

The thus obtained magnetic tapes corresponding to the various mixing ratio of oxygen gas to helium gas and the various position were measured for magnetic characteristics and for video outputs with the same manner as in Example 1. The results are shown in Table 3.

TABLE 3

| Sample No. | Vapor Deposition Conditions | | R/r Value | Magnetic Characteristics | | Video Output (dB) |
|---|---|---|---|---|---|---|
| | He Amount Introduced (cc/min) | $O_2$ Amount Introduced (cc/min) | | Coercive Force (Oe) | Squareness Ratio | |
| 17 | 0 | 800 | 1.06 | 750 | 0.77 | 1.0 |
| 18 | 0 | 800 | 1.12 | 730 | 0.77 | 1.0 |
| 19 | 800 | 0 | 1.06 | 920 | 0.92 | 6.5 |
| 20 | 800 | 0 | 1.12 | 750 | 0.92 | 1.5 |
| 21 | 800 | 800 | 1.06 | 935 | 0.88 | 6.0 |
| 22 | 800 | 800 | 1.12 | 850 | 0.86 | 2.0 |

As shown in Table 3, magnetic tapes prepared by the method of the present invention had excellent magnetic characteristics and characteristics of high video outputs.

EXAMPLE 4

Various magnetic tapes were prepared under the same conditions as in Example 1 except that several kinds of mixed gases of carbon dioxide gas and oxygen gas having various mixing ratios thereof were used as the introduced gas. The thus obtained magnetic tapes were measured for magnetic characteristics, for film strength, and for curling. For the film strength, the surface of the magnetic film was scratched with a loaded sapphire needle having a tip with a diameter of 0.4 mm. The film strength was determined from the value of the load when peeling of the film occurred.

As shown in Table 4, when oxygen gas or the mixed gas of carbon dioxide with oxygen gas having a mixing ratio of the oxygen gas to the carbon dioxide gas in the range of 2.0 or less by volume is introduced through the nozzle 15, magnetic recording media having excellent magnetic characteristics, film strength, and anti-curling properties can be obtained.

EXAMPLE 5

Various magnetic tapes were prepared under the same conditions as in Example 4 except that carbon dioxide gas was introduced through the nozzle 15 at a rate of 280 cc/min and that the various positions of the nozzle 15 had various values of the ratio R/r. Magnetic characteristics, film strength and curls of the thus obtained magnetic tapes corresponding to various values of the ratio R/r were measured in the same manner as in Example 4. A comparative sample of the magnetic tape was prepared under the condition that carbon dioxide gas was introduced through the nozzle 16. The results are shown in Table 5.

TABLE 5

| Sample No. | R/r Value | Magnetic Characteristics | | Film Strength (g) | Curl Value |
|---|---|---|---|---|---|
| | | Coercive Force (Oe) | Squareness Ratio | | |
| 34 | 1.01 | 905 | 0.92 | 53 | 3 |
| 35 | 1.10 | 850 | 0.92 | 50 | 5 |
| 36 | 1.15 | 640 | 0.92 | 41 | 14 |
| 37 | 1.20 | 595 | 0.92 | 37 | 14 |
| 38 | through nozzle 16 | 580 | 0.92 | 35 | 15 |

Comparison of sample No. 26 in Table 4 and sample Nos. 34, 35, 36, 37, and 38 in Table 5 indicates clearly that when carbon dioxide gas is introduced through the nozzle set at a position having a ratio R/r in the range of 1.10 or less, excellent magnetic recording media can be obtained.

EXAMPLE 6

Magnetic tapes were prepared under the same conditions as in Example 3 except that the several mixed gases of carbon dioxide gas and oxygen gas having various mixing ratios thereof were used as the introduced gas. The thus obtained magnetic tapes were measured for magnetic characteristics, for film strength and for curling in the same manner as in Example 4. The reuslts are shown in Table 6.

TABLE 6

| Sample No. | Vapor Deposition Conditions | | R/r Value | Magnetic Characteristics | | Film Strength (g) | Curl Value |
|---|---|---|---|---|---|---|---|
| | $CO_2$ Amount Introduced (cc/min) | $O_2$ Amount Introduced (cc/min) | | Coercive Force (Oe) | Squareness Ratio | | |
| 39 | 0 | 800 | 1.06 | 780 | 0.78 | 34 | 25 |
| 40 | 0 | 800 | 1.12 | 740 | 0.78 | 33 | 23 |
| 41 | 800 | 0 | 1.06 | 890 | 0.92 | 51 | 8 |
| 42 | 800 | 0 | 1.12 | 780 | 0.92 | 42 | 15 |
| 43 | 800 | 800 | 1.06 | 925 | 0.88 | 53 | 7 |
| 44 | 800 | 800 | 1.12 | 870 | 0.87 | 43 | 12 |

As shown in Table 6, magnetic tapes prepared by the method of the present invention have excellent magnetic characteristics and film strength and also small curl values.

EXAMPLE 7

Several magnetic tapes were prepared under the same conditions as in Example 1 except that the several mixed gases of nitrogen gas and oxygen gas having various mixing ratios thereof were used as the introduced gas. Stearyl alcohol as a lubricant was applied to the surface of the ferromagnetic metal film of the thus obtained magnetic tapes in an amount of 10 mg/m² to prepare magnetic tapes having a lubricating layer. The magnetic characteristics of the magnetic tapes having the lubricating layer were measured, and these tapes had been slided 70 times both ways over a stainless steel rod (SUS 303) having a diameter of 4 mm. Then the friction coefficient of the magnetic tapes was measured.

TABLE 7

| Sample No. | Vapor deposition Conditions | | Magnetic Characteristics | | Friction Coefficient |
|---|---|---|---|---|---|
| | $N_2$ Amount Introduced (cc/min) | $O_2$ Amount Introduced (cc/min) | Coercive Force (Oe) | Squareness Ratio | |
| 45 | 0 | 0 | 570 | 0.92 | 0.42 |
| 46 | 150 | 0 | 740 | 0.92 | 0.23 |
| 47 | 320 | 0 | 875 | 0.92 | 0.22 |
| 48 | 0 | 365 | 730 | 0.81 | 0.37 |
| 49 | 150 | 365 | 815 | 0.82 | 0.34 |
| 50 | 320 | 365 | 930 | 0.85 | 0.22 |
| 51 | 0 | 590 | 850 | 0.74 | 0.39 |
| 52 | 150 | 590 | 900 | 0.76 | 0.35 |
| 53 | 320 | 590 | 985 | 0.82 | 0.23 |

As shown in Table 7, when the mixed gas of nitrogen gas and oxygen gas having a mixing ratio of the oxygen gas to the nitrogen gas in the range of from 0 to 2.0 by volume is introduced from the nozzle 15, magnetic recording media having a lubricating layer which have excellent magnetic characteristics and a low friction coefficient can be obtained.

EXAMPLE 8

Magnetic tapes were prepared under the same conditions as in Example 7 except that nitrogen gas was introduced through the nozzle 15 at a rate of 320 cc/min. In this process, the position of nozzle 15 was changed variously to vary the ratio R/r. Thus, magnetic tapes corresponding to the various values of the ratio R/r were prepared, and they were measured for the magnetic characteristics and for the friction coefficient in the same manner as in Example 7. In addition, as a comparative sample, a magnetic tape was prepared under the condition that nitrogen gas was introduced through the nozzle 16 in the apparatus shown in the FIGURE. The results obtained are shown in Table 8.

TABLE 8

| Sample No. | R/r Value | Magnetic Characteristics | | Friction Coefficient |
|---|---|---|---|---|
| | | Coercive Force (Oe) | Squareness Ratio | |
| 54 | 1.01 | 910 | 0.92 | 0.22 |
| 55 | 1.10 | 855 | 0.92 | 0.23 |
| 56 | 1.15 | 600 | 0.92 | 0.38 |
| 57 | 1.20 | 585 | 0.92 | 0.39 |
| 58 | Through nozzle 16 | 575 | 0.92 | 0.38 |

Comparison of sample No. 47 in Example 7 and sample Nos. 54, 55, 56, 57, and 58 in Example 8 indicates clearly that when the nozzle 15 is set at a position having a ratio R/r in the range of 1.10 or less and that when nitrogen gas is introduced through the nozzle 15, excellent magnetic recording media can be obtained.

EXAMPLE 9

Magnetic tapes were prepared under the same conditions as in Example 3 except that the various mixed gases of $NO_2$ gas and oxygen gas having various mixing ratios thereof were used as the introduced gas. After that, stearyl alcohol as a lubricant was applied to the surface of vapor deposited film of the thus obtained magnetic tapes in an amount of 10 mg/m² to prepare magnetic tapes having a lubricating layer. In the above-mentioned preparation process for magnetic tapes, in addition, the position of the nozzle 15 was changed variously. The thus prepared magnetic tapes having a lubricating layer were measured for the magnetic characteristics and for the friction coefficient in the same manner as in Example 7. The results obtained are shown in Table 9.

TABLE 9

| Sample No. | Vapor Deposition Conditions | | R/r Value | Magnetic Characteristics | | Friction Coefficient |
| --- | --- | --- | --- | --- | --- | --- |
| | CO$_2$ Amount Introduced (cc/min) | O$_2$ Amount Introduced (cc/min) | | Coercive Force (Oe) | Squareness Ratio | |
| 59 | 0 | 800 | 1.06 | 750 | 0.77 | 0.41 |
| 60 | 0 | 800 | 1.12 | 730 | 0.77 | 0.39 |
| 61 | 800 | 0 | 1.06 | 940 | 0.92 | 0.23 |
| 62 | 800 | 0 | 1.12 | 735 | 0.92 | 0.37 |
| 63 | 800 | 800 | 1.06 | 955 | 0.89 | 0.24 |
| 64 | 800 | 800 | 1.12 | 800 | 0.86 | 0.42 |

As shown in Table 9, magnetic tapes prepared by the method of the present invention have excellent magnetic characteristics and at the same time, have small friction coefficients.

As mentioned above, magnetic recording media having excellent magnetic characteristics can be prepared by forming a ferromagnetic metal film on a tape-shaped substrate by an oblique vapor deposition method while introducing one or more gases selected from the group consisting of a rare gas, carbon dioxide gas, nitrogen gas, nitrogen oxide gas, and a mixed gas composed of oxygen gas and one of these gases through a gas inlet nozzle set at a position in the vicinity of the tape-shaped substrate moving along the cooling can and also near the vapor stream at a low incident angle ($\theta$min) upon the said substrate.

While the invention has been described in detail and with reference to specific embodiments thereof, it will be apparent to one skilled in the art that various changes and modifications can be made therein without departing from the spirit and scope thereof.

What is claimed is:

1. A method for manufacturing a magnetic recording medium, comprising evaporating a magnetic metal material from an evaporation source to form a vapor stream of the magnetic metal material in a vacuum vessel, vapor-depositing the magnetic metal material on a tape-shaped substrate moving along a cooling can such that the incident angle ($\theta$) of the vapor stream which is incident upon the substrate changes continuously from a high incident angle ($\theta$max) to a low incident angle ($\theta$min), and at the same time introducing one or more gases selected from the group consisting of a rare gas, CO$_2$ gas, N$_2$ gas, and nitrogen oxide gas, or a mixed gas composed of oxygen gas and one or more gases selected from the group consisting of a rare gas, CO$_2$ gas, N$_2$ gas and nitrogen oxide gas from a gas inlet nozzle disposed at a position in the vicinity of the substrate and near the vapor stream at a low incident angle ($\theta$min) upon the substrate, thereby providing a ferromagnetic metal film on the substrate, wherein the gas inlet nozzle is disposed so that the ratio (R/r) of a distance (R) from the center of said cooling can to said gas inlet nozzle to the radius (r) of said cooling can is within the range of 1.10 or less, wherein a mask is disposed between the evaporation source and the tape-shaped substrate, which mask is separate from the gas inlet nozzle and which mask controls the incident angle ($\theta$) of the vapor stream so that only vapor stream of the desired incident angle ($\theta$) contacts the tape-shaped substrate.

2. A method for manufcturing magnetic recording medium as claimed in claim 1, wherein the introduced gas comprises a gas other than oxygen gas or the gas other than oxygen gas containing oxygen gas in a mixing ratio of the oxygen gas to the other than oxygen gas of 2.0 or less by volume.

3. A method for manufacturing magnetic recording medium as claimed in claim 2, wherein the introduced gas comprises a gas other than oxygen gas or the gas other than oxygen gas containing oxygen gas in a mixing ratio of the oxygen gas to the other than oxygen gas in the range of from 0.5 to 2.0 by volume.

4. A method for manufacturing magnetic recording medium as claimed in claim 1, wherein the introduced gas is selected from the group consisting of a rare gas or a mixed gas composed of oxygen gas and a rare gas.

5. A method for manufacturing magnetic recording medium as claimed in claim 4, wherein the introduced gas is selected from the group consisting of Ar or Ne gas or a mixed gas composed of oxygen gas and Ar or Ne gas.

6. A method for manufacturing magnetic recording medium as claimed in claim 1, wherein the introduced gas is selected from the group consisting of CO$_2$ gas or a mixed gas composed of oxygen gas and CO$_2$ gas.

7. A method for manufacturing magnetic recording medium as claimed in claim 1, wherein the introduced gas is selected from the group consisting of N$_2$ gas or a nitrogen oxide gas, or a mixed gas composed of oxygen gas and N$_2$ gas or a nitrogen oxide gas.

8. A method for manufacturing magnetic recording medium as claimed in claim 7, wherein the introduced gas is selected from the group consisting of N$_2$O gas, or a mixed gas composed of oxygen gas and N$_2$O gas.

9. A method for manufacturing a magnetic recording medium as claimed in claim 1, wherein the gas inlet nozzle is disposed at a position nearer the cooling can than the mask.

10. A method for manufacturing magnetic recording medium as claimed in claim 1, wherein the gas inlet part is disposed so that the ratio (R/r) of a distance (R) from the center of said cooling can to said gas inlet part to the radius (r) of said cooling can is within the range of from 1.0 to 1.10.

11. A method for manufacturing a magnetic recording medium as claimed in claim 1, wherein the vapor stream passes the mask after issuing from the evaporation source, the incident angle ($\theta$) of the vapor stream thereby being controlled by the mask, whereafter the one or more gases are introduced from the gas inlet nozzle.

12. A method for manufacturing a magnetic recording medium as claimed in claim 11, wherein the gas inlet nozzle is substantially at the point where the vapor stream is at the low incident angle ($\theta$) upon the substrate.

13. A method for manufacturing a magnetic recording medium as claimed in claim 11, wherein the one or more gases selected from the group consisting of a rare gas, CO$_2$ gas, N$_2$ gas and nitrogen oxide gas or a mixed gas composed of oxygen gas and one or more gases selected from the group consisting of a rare gas, CO$_2$ gas, $N_2$ gas and nitrogen oxide gas are argon and oxygen at a mixing ratio of oxygen to argon of 0.5 to 2.0.

14. A method for manufacturing a magnetic recording medium as claimed in claim 11, wherein the one or more gases selected from the group consisting of a rare gas, $CO_2$ gas, $N_2$ gas and nitrogen oxide gas or a mixed gas composed of oxygen gas and one or more gases selected from the group consisting of a rare gas, $CO_2$ gas, $N_2$ gas and nitrogen oxide gas are helium and oxygen at a mixing ratio of oxygen to helium of 0.5 to 2.0.

15. A method for manufacturing a magnetic recording medium as claimed in claim 11, wherein the one or more gases selected from the group consisting of a rare gas, $CO_2$ gas, $N_2$ gas and nitrogen oxide gas or a mixed gas composed of oxygen gas and one or more gases selected from the group consisting of a rare gas, $CO_2$ gas, $N_2$ gas and nitrogen oxide gas are carbon dioxide and oxygen at a mixing ratio of oxygen to carbon dioxide of 0.5 to 2.0.

16. A method for manufacturing a magnetic recording medium as claimed in claim 11, wherein the one or more gases selected from the group consisting of a rare gas, $CO_2$ gas, $N_2$ gas and nitrogen oxide gas or a mixed gas composed of oxygen gas and one or more gases selected from the group consisting of a rare gas, $CO_2$ gas, $N_2$ gas and nitrogen oxide gas are nitrogen and oxygen at a mixing ratio of oxygen to nitrogen of 0.5 to 2.0.

17. A method for manufacturing a magnetic recording medium as claimed in claim 11, wherein the one or more gases selected from the group consisting of a rare gas, $CO_2$ gas, $N_2$ gas and nitrogen oxide gas or a mixed gas composed of oxygen gas and one or more gases selected from the group consisting of a rare gas, $CO_2$ gas, $N_2$ gas and nitrogen oxide gas are $NO_2$ and oxygen at a mixing ratio of oxygen to $NO_2$ of 0.5 to 2.0.

18. A method for manufacturing a magnetic recording medium as claimed in claim 1, which further comprises applying a lubricant to the thus formed ferromagnetic metal film to form a lubricant layer thereon.

19. A method for manufacturing a magnetic recording medium as claimed in claim 1, wherein the gas inlet nozzle is disposed at a position in the vicinity of the substrate after the vapor stream is contacted with the tape-shaped substrate and the tape-shaped substrate is passing from a delivery roll to a wind-up roll.

* * * * *